United States Patent
Luetkens, Jr. et al.

(10) Patent No.: US 9,273,258 B2
(45) Date of Patent: *Mar. 1, 2016

(54) METHODS OF PRODUCING JET FUEL FROM NATURAL OIL FEEDSTOCKS THROUGH METATHESIS REACTIONS

(71) Applicant: Elevance Renewable Sciences, Inc., Woodridge, IL (US)

(72) Inventors: Melvin L. Luetkens, Jr., Batavia, IL (US); Steven A. Cohen, Naperville, IL (US); Chander Balakrishnan, Oak Park, IL (US)

(73) Assignee: Elevance Renewable Sciences, Inc., Woodridge, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/563,447

(22) Filed: Dec. 8, 2014

(65) Prior Publication Data

US 2015/0094504 A1    Apr. 2, 2015

Related U.S. Application Data

(63) Continuation of application No. 13/129,170, filed as application No. PCT/US2009/065922 on Nov. 25, 2009, now Pat. No. 8,933,285.

(60) Provisional application No. 61/118,338, filed on Nov. 26, 2008.

(51) Int. Cl.
| | | |
|---|---|---|
| C10G 3/00 | (2006.01) | |
| C10L 1/04 | (2006.01) | |
| C10L 1/08 | (2006.01) | |
| C10L 1/00 | (2006.01) | |
| C10L 1/06 | (2006.01) | |

(52) U.S. Cl.
CPC ... *C10L 1/08* (2013.01); *C10G 3/50* (2013.01); *C10L 1/04* (2013.01); *C10G 2300/1014* (2013.01); *C10G 2300/1088* (2013.01); *C10G 2300/30* (2013.01); *C10G 2400/08* (2013.01); *C10L 2200/0484* (2013.01); *C10L 2270/04* (2013.01); *Y02P 30/20* (2015.11)

(58) Field of Classification Search
CPC .............. C10L 1/00; C10L 1/04; C10L 1/06; C10L 1/08; C10G 3/00; C10G 3/42; C10G 3/45; C10G 3/46; C10G 3/47
See application file for complete search history.

(56) References Cited

U.S. PATENT DOCUMENTS

2008/0229654 A1 * 9/2008 Bradin ........................ 44/308
2011/0160472 A1 * 6/2011 Lemke et al. ................ 554/154

* cited by examiner

*Primary Examiner* — Brian McCaig
(74) *Attorney, Agent, or Firm* — Robert S. Dailey

(57) ABSTRACT

Methods are provided for producing a jet fuel composition from a feedstock including a natural oil. The methods include reacting the feedstock with a low-weight olefin in the presence of a metathesis catalyst under conditions sufficient to form a metathesized product. The methods further include hydrogenating the metathesized product under conditions sufficient to form a jet fuel composition.

14 Claims, 1 Drawing Sheet

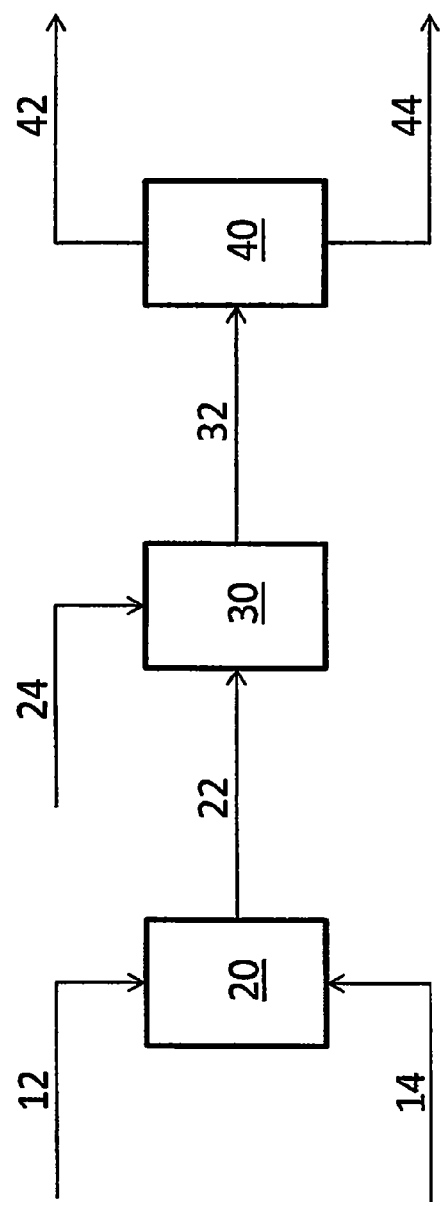

METHODS OF PRODUCING JET FUEL FROM NATURAL OIL FEEDSTOCKS THROUGH METATHESIS REACTIONS

CROSS-REFERENCE TO RELATED APPLICATIONS

This application is a continuation application of U.S. patent application Ser. No. 13/129,170, which was filed on May 13, 2011, and issued as U.S. Pat. No. 8,933,285, which is the United States national-stage application of International Application No. PCT/US2009/065922, filed Nov. 25, 2009, which claims the benefit of United States Provisional Application No. 61/118,338, filed Nov. 26, 2008, the disclosures of which are incorporated herein by reference in their entirety.

TECHNICAL FIELD OF THE INVENTION

This application relates to methods of producing jet fuel through metathesis reactions of natural feedstocks.

BACKGROUND OF THE INVENTION

Metathesis is a catalytic reaction, generally known in the art that involves the interchange of alkylidene units among compounds containing one or more double bonds (e.g., olefinic compounds) via the formation and cleavage of the carbon-carbon double bonds. Metathesis may occur between two like molecules (often referred to as self-metathesis) and/or it may occur between two different molecules (often referred to as cross-metathesis). Self-metathesis may be represented schematically as shown in Equation I.

(I)

wherein $R^1$ and $R^2$ are organic groups.

Cross-metathesis may be represented schematically as shown in Equation II.

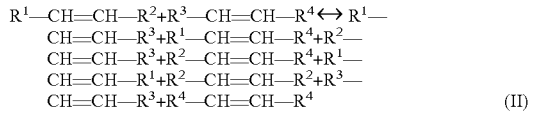

(II)

wherein $R^1$, $R^2$, $R^3$, and $R^4$ are organic groups.

In recent years, there has been an increased demand for environmentally friendly techniques for manufacturing materials typically derived from petroleum sources. For example, researchers have been studying the feasibility of manufacturing biofuels, waxes, plastics, and the like, using natural feedstocks, such as vegetable and seed-based oils. In one example, metathesis catalysts are used to manufacture candle wax, as described in PCT/US 2006/000822, which is herein incorporated by reference. Metathesis reactions involving natural feedstocks offer promising solutions for today and for the future.

Natural feedstocks of interest include, for example, natural oils (e.g., vegetable oils, fish oil, animal fats) and derivatives of natural oils, such as fatty acids and fatty acid alkyl (e.g., methyl) esters. These feedstocks may be converted into industrially useful chemicals (e.g., waxes, plastics, cosmetics, biofuels, etc.) by any number of different metathesis reactions. Significant reaction classes include, for example, self-metathesis, cross-metathesis with olefins, and ring-opening metathesis reactions. Representative examples of useful metathesis catalysts are provided below. Metathesis catalysts can be expensive and, therefore, it is desirable to improve the efficiency of the metathesis catalyst.

In recent years, there has been an increased demand for petroleum-based transportation fuels. Concerns exist that the world's petroleum production may not be able to keep up with demand. Additionally, the increased demand for petroleum-based fuels has resulted in a higher production of greenhouse gases. In particular, the airline industry accounts for greater than 10% of the greenhouse gases within the United States. Due to the increased demand for fuel and increased production of greenhouse gases, there is a need to explore methods of producing environmentally-friendly, alternative fuel sources. In particular, there is a need to explore methods of producing environmentally friendly jet fuel from a natural feedstock.

BRIEF SUMMARY OF THE INVENTION

Methods are disclosed for producing jet fuel from a metathesis reaction between a natural oil feedstock and a low-weight olefin.

In one embodiment, the method comprises reacting a feedstock comprising a natural oil, such as soybean oil, with a low-weight olefin in the presence of a metathesis catalyst under conditions sufficient to form a metathesized product. The method further comprises hydrogenating the metathesized product under conditions sufficient to form a jet fuel composition.

In another embodiment, the method further comprises separating water from the jet fuel composition, wherein the jet fuel composition comprises hydrocarbons having a carbon number distribution between 5 and 16 carbon numbers. In another embodiment, after the separating, the method further comprises isomerizing the jet fuel composition, wherein a fraction of normal-paraffin compounds in the jet fuel composition are isomerized into iso-paraffin compounds.

BRIEF DESCRIPTION OF THE DRAWINGS

FIG. 1 is a schematic diagram of a process to produce a jet fuel composition from a natural oil.

DETAILED DESCRIPTION OF THE INVENTION

The present application relates to methods of producing jet fuel from natural oil feedstock.

As used herein, the singular forms "a," "an," and "the" include plural referents unless the context clearly dictates otherwise. For example, reference to "a substituent" encompasses a single substituent as well as two or more substituents, and the like.

As used herein, the terms "for example," "for instance," "such as," or "including" are meant to introduce examples that further clarify more general subject matter. Unless otherwise specified, these examples are provided only as an aid for understanding the applications illustrated in the present disclosure, and are not meant to be limiting in any fashion.

As used herein, the term "metathesis catalyst" includes any catalyst or catalyst system that catalyzes a metathesis reaction.

As used herein, the terms "natural oil," "natural feedstock," or "natural oil feedstock" refer to an oil derived from a plant or animal source. The term "natural oil" includes natural oil derivatives, unless otherwise indicated. Examples of natural oils include, but are not limited to, vegetable oils, algae oils, animal fats, tall oils, derivatives of these oils, combinations of any of these oils, and the like. Representative examples of vegetable oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, and castor oil. Representative examples of animal fats include lard, tallow, chicken fat, yellow grease, and fish oil. Tall oils are byproducts of wood pulp manufacture.

As used herein, the term "natural oil derivatives" refers to the compounds or mixture of compounds derived from the natural oil using any one or combination of methods known in the chemical arts. Such methods include saponification, esterification, hydrogenation (partial or full), isomerization, oxidation, and reduction. Representative examples of natural oil derivatives include gums, phospholipids, soapstock, acidulated soapstock, distillate or distillate sludge, fatty acids and fatty acid alkyl (e.g., methyl) esters of the natural oil. For example, the natural oil derivative may be a fatty acid methyl ester (FAME) derived from the glyceride of the natural oil. In some preferred embodiments, a feedstock includes canola or soybean oil, for example, refined, bleached, and deodorized soybean oil (i.e., RBD soybean oil). Soybean oil is an unsaturated polyol ester of glycerol that typically comprises about 95% weight or greater (e.g., 99% weight or greater) triglycerides of fatty acids. Major fatty acids in the polyol esters of soybean oil include saturated fatty acids, for example, palmitic acid (hexadecanoic acid) and stearic acid (octadecanoic acid), and unsaturated fatty acids, for example, oleic acid (9-octadecenoic acid), linoleic acid (9,12-octadecadienoic acid), and linolenic acid (9,12,15-octadecatrienoic acid).

As used herein, the term "low-weight olefin" may refer to any one or combination of unsaturated straight, branched, or cyclic hydrocarbons in the $C_2$ to $C_{10}$ range. Low-weight olefins include "alpha-olefins" or "terminal olefins," wherein the unsaturated carbon-carbon bond is present at one end of the compound. Low weight olefins may also include dienes or trienes. Examples of low-weight olefins in the $C_2$ to $C_5$ range include, but are not limited to: ethylene, propylene, 1-butene, 2-butene, isobutene, 1-pentene, 2-pentene, 3-pentene, 2-methyl-1-butene, 2-methyl-2-butene, 3-methyl-1-butene, and cyclopentene. Other possible low-weight olefins of note include styrene and vinyl cyclohexane. In certain embodiments, it is preferable to use a mixture of olefins, the mixture containing branched low-weight olefins in the $C_4$-$C_{10}$ range.

As used herein, the terms "metathesize" and "metathesizing" refer to the reacting of a feedstock in the presence of a metathesis catalyst to form a "metathesized product" comprising a new olefinic compound. Metathesizing may refer to cross-metathesis (a.k.a. co-metathesis), self-metathesis, ring-opening metathesis, ring-opening metathesis polymerizations (ROMP), ring-closing metathesis (RCM), and acyclic diene metathesis (ADMET). For example, metathesizing may refer to reacting two triglycerides present in a natural feedstock (self-metathesis) in the presence of a metathesis catalyst, wherein each triglyceride has an unsaturated carbon-carbon double bond, thereby forming two new olefinic molecules which may include a dimer of the triglyceride. Such triglyceride dimers may have more than one olefinic bond, thus higher oligomers also may form. Additionally, metathesizing may refer to reacting an olefin, such as ethylene, and a triglyceride in a natural feedstock having at least one unsaturated carbon-carbon double bond, thereby forming two new olefinic molecules (cross-metathesis).

As used herein, the term "isomerization," "isomerize(s)," or "isomerizing" refers to the reaction and conversion of straight-chain hydrocarbon compounds, such as normal paraffins or normal olefins, into branched hydrocarbon compounds, such as iso-paraffins or iso-olefins (paraffins may also be referred to as alkanes herein). For example, n-pentane may be isomerized into a mixture of n-pentane, 2-methylbutane, and 2,2-dimethylpropane. Isomerization of normal paraffins or normal olefins may be used to improve the overall properties of a fuel composition.

As used herein, the term "yield" may refer to the total weight of jet fuel produced from the metathesis and hydrogenation reactions. It may also refer to the total weight of the jet fuel following a separation step and/or isomerization reaction. It may be defined in terms of a yield %, wherein the total weight of the jet fuel produced is divided by the total weight of the natural oil feedstock and low-weight olefin, combined.

As used herein, the term "jet fuel" or "aviation fuel" may refer to kerosene or naphtha-type fuel cuts, or military-grade jet fuel compositions. "Kerosene-type" jet fuel (including Jet A and Jet A-1) has a carbon number distribution between about 8 and 16. Jet A and Jet A-1 typically have a flash point between 38° C. and 66° C., an auto ignition temperature of approximately 210° C., a freeze point between approximately −47° C. and −40° C., a density of approximately 0.8 g/cc at 15° C., and an energy density of approximately 42.8-43.2 MJ/kg. "Naphtha-type" or "wide-cut" jet fuel (including Jet B) has a carbon number between about 5 and 15. Jet B typically comprises a flash point between approximately −23° C. and 0° C., an auto ignition temperature of approximately 250° C., a freeze point of approximately −65° C., a density of approximately 0.78 g/cc, and an energy density of approximately 42.8-43.5 MJ/kg. "Military grade" jet fuel refers to the Jet Propulsion or "JP" numbering system (JP-1, JP-2, JP-3, JP-4, JP-5, JP-6, JP-7, JP-8, etc.). Military grade jet fuels may comprise alternative or additional additives to have higher flash points than Jet A, Jet A-1, or Jet B in order to cope with heat and stress endured during supersonic flight. Additionally, these fuel compositions may generally refer to materials meeting required specifications or to blend components that are useful in formulating fuel compositions but, by themselves, do not meet all of the required specifications for a fuel.

As used herein, the term "carbon number distribution" may refer to the range of compounds present in a composition, wherein each compound is defined by the number of carbon atoms present. For example, jet fuel typically comprises a distribution of hydrocarbon compounds wherein a majority of those compounds have between 5 and 16 carbon atoms each. A similar carbon number distribution of hydrocarbon compounds between 5 and 16 carbon atoms may also comprise diesel fuel.

As used herein, the term "energy density" may refer to the amount of energy stored in a given system per unit mass (MJ/kg) or per unit volume (MJ/L). For example, the energy density of jet fuel is typically greater than 40 MJ/kg.

In accordance with the present invention, a high yield jet fuel composition is created by reacting a natural oil with a low-weight olefin in the presence of a metathesis catalyst.

As shown in FIG. 1, a natural oil 12 is combined with a low-weight olefin 14 in a metathesis reactor 20. In the presence of a metathesis catalyst, the natural oil 12 undergoes a cross-metathesis reaction with the low-weight olefin 14. Metathesis catalysts and metathesis reaction conditions are discussed in greater detail below. In one embodiment, the low-weight olefin is in the $C_2$ to $C_5$ range. For example, in one embodiment, the low-weight olefin may preferably comprise at least one of the following: ethylene, propylene, 1-butene, 2-butene, isobutene, 1-pentene, 2-pentene, 3-pentene, 2-methyl-1-butene, 2-methyl-2-butene, 3-methyl-1-butene, and cyclopentene. In another embodiment, the low-weight olefin preferably comprises at least one of styrene and vinyl cyclohexane. In another embodiment, the low-weight olefin may comprise at least one of ethylene, propylene, 1-butene, 2-butene, and isobutene. In another embodiment, the low-weight olefin comprises at least one alpha-olefin or terminal olefin in the $C_2$ to $C_{10}$ range.

In another embodiment, the low-weight olefin comprises at least one branched low-weight olefin in the $C_4$ to $C_{10}$ range. Branched low-weight olefins may help achieve the desired performance properties for the jet fuel. Examples of branched low-weight olefins include isobutene, 3-methyl-1-butene, 2-methyl-3-pentene, and 2,2-dimethyl-3-pentene. By using these branched low-weight olefins in the metathesis reaction, the metathesized product 22 will include branched olefins, which can be subsequently hydrogenated to iso-paraffins.

As noted, it is possible to use a mixture of various low-weight olefins in the reaction to achieve the desired metathesis product distribution. For example, a mixture of butenes (1-butene, 2-butene, and isobutene) may be employed as the low-weight olefin, offering a lower cost feedstock than a purified source of one particular butene. Additionally, the natural oil preferably is a vegetable oil or vegetable oil derivative, such as soybean oil.

The cross-metathesis reaction in the metathesis reactor 20 produces a metathesized product 22. In one embodiment, based upon the quality of the metathesized product 22, it is preferable to isomerize the metathesized product 22 to assist in targeting the desired jet fuel properties like the flash point, freeze point, or energy density. Isomerization reactions are well-known in the art, as described in U.S. Pat. Nos. 3,150,205; 4,210,771; 5,095,169; and 6,214,764, herein incorporated by reference. An isomerization reaction at this stage may also crack some of the $C_{18+}$ compounds, and assist in producing a jet fuel composition having compounds within the desired carbon number range of 5 to 16.

In one embodiment, the metathesized product 22 is sent to a hydrogenation unit 30. The metathesized product 22 may contain 1,4-cyclohexadiene that can oxidize into benzene or, upon hydrogenation, form the saturated cyclohexane. These six-carbon cyclic compounds are unique components for fuels produced by the cross-metathesis reaction.

In certain embodiments, it is preferable to separate the byproducts from the metathesized product 22 prior to introduction to the hydrogenation unit 30. In particular, approximately 5-18% of $C_3$'s are generated during the cross-metathesis reaction between the natural oil and a $C_2$-$C_4$ low-weight olefin. These light-end hydrocarbons have their own value outside the scope of a jet fuel composition, and may be separated at this stage for other valued compositions and uses.

In the hydrogenation unit 30, hydrogen gas 24 is reacted with the metathesized product 22. During hydrogenation, the carbon-carbon double bonds from the metathesized product 22 are saturated by the hydrogen gas 24. Additionally, the natural oil esters, acids, and alcohols are reduced into hydrocarbons. The resulting hydrogenated product 32 includes hydrocarbons with a distribution preferably centered between approximately $C_{10}$ and $C_{12}$ hydrocarbons. The hydrogenated product 32 may also contain byproducts from the hydrogenation and metathesis reactions, including water or heavy hydrocarbon chains ($C_{18}+$). Process conditions for the hydrogenation step are well-known in the art, as discussed in PCT/EP2007/009668.

The hydrogenated product 32 may be used as a jet fuel composition. Alternatively, the hydrogenated product 32 may be sent to a separation unit 40 to remove any byproducts 44 (i.e. water, light ($C_2$-$C_4$) hydrocarbons, or $C_{18}+$) from the desired jet fuel composition 42. In one embodiment, the hydrogenated product 32 may be separated into a targeted jet fuel composition fraction 42, a light-ends fraction (not shown) and a heavy-ends byproducts fraction, shown as 44 for this embodiment. The hydrogenated product 32 may contain byproducts from the cross-metathesis reaction that would be separated at this stage if a separation step was not performed prior to the hydrogenation step. In one embodiment, distillation is used to separate the fractions. Alternatively, the heavy-ends byproducts fraction can be separated from the target jet fuel composition fraction by cooling the hydrogenated product 32 to approximately 38-66° C., or −47-40° C., or −65° C. and then removing the solid fraction by techniques known in the art such as filtration or centrifugation.

In another embodiment, based upon the quality of the hydrogenated product 32 or the jet fuel composition 42, there may be a need for further processing to target the desired jet fuel properties like the flash point, freeze point, or energy density. For instance, there may be a need to isomerize the n-paraffin hydrocarbons in the hydrogenated product 32 or jet fuel composition 42, and produce a mixture of n-paraffin and iso-paraffin compounds. Isomerization reactions are well-known in the art, as described in U.S. Pat. Nos. 3,150,205; 4,210,771; 5,095,169; and 6,214,764, herein incorporated by reference. If the separation step is present in the embodiment, it is preferable to conduct the isomerization reaction after separation of the light- and/or heavy-ends.

It is possible that the isomerization step may be avoided or reduced in scope based upon which low-weight olefin or olefins were used in the previous metathesis reaction.

Cross-metathesis of a natural oil can produce a jet fuel composition 42 having at least 20 wt % of $C_{10}$ compounds, as shown in the example 1 composition below. Additionally, the composition may comprise less than 30 wt % of $C_{14+}$ compounds. In these compositions, various performance parameters are targeted for specific types of jet fuel.

In certain embodiments, cross-methathesis of a natural oil can produce a jet fuel composition having at least 70 wt % $C_9$-$C_{15}$ compounds, such as $C_9$-$C_{15}$ alkanes. In other embodiments, cross-metathesis of a natural oil can produce a jet fuel composition having at least 80 wt % $C_9$-$C_{15}$ compounds, such as $C_9$-$C_{15}$ alkanes.

In one embodiment, the natural oil is converted into a kerosene-type jet fuel comprising a carbon number distribution between 8 and 16 carbon numbers. This kerosene-type jet fuel distribution includes Jet A or Jet A-1. In this embodiment, it is preferable to have a flash point between approximately 38° C. and 66° C. It is also preferable to have an auto ignition temperature of approximately 210° C. It is also preferable to have a freeze point between approximately −47° C. and −40° C. (closer to −47° C. for a Jet A-1 type fuel and closer to −40° C. for a Jet A type fuel). It is also preferable to have a density of approximately 0.8 g/cc at 15° C. It is also preferable to have an energy density greater than 40 MJ/kg. It is more preferable to have an energy density between 42 and 48 MJ/kg. It is even more preferable to have an energy density for kerosene-type jet fuel of approximately 42.8-43.2 MJ/kg.

Kerosene-type jet fuel is targeted by cross-metathesizing the natural oil with a low-weight olefin that will achieve desired jet fuel properties as well as a distribution between $C_8$ and $C_{16}$.

In another embodiment, the natural oil is converted into a naphtha-type jet fuel comprising a carbon number distribution between 5 and 15 carbon numbers. This naphtha-type jet fuel distribution includes Jet B. In this embodiment, it is preferable to have a flash point between approximately −23° C. and 0° C. It is also preferable to have an auto ignition temperature of approximately 250° C. It is also preferable to have a freeze point of approximately −65° C. It is also preferable to have a density of approximately 0.78 g/cc at 15° C. It is also preferable to have an energy density greater than 40

MJ/kg. It is more preferable to have an energy density between 42 and 48 MJ/kg. It is even more preferable to have an energy density for naphtha-type jet fuel of approximately 42.8-43.5 MJ/kg.

Naphtha-type jet fuel is targeted by cross-metathesizing the natural oil with a low-weight olefin that will achieve the desired jet fuel properties as well as a desired distribution between $C_5$ and $C_{15}$.

As noted, the cross-metathesis between the natural oil and alpha-olefin occurs in the presence of a metathesis catalyst. The term "metathesis catalyst" includes any catalyst or catalyst system that catalyzes a metathesis reaction. Any known or future-developed metathesis catalyst may be used, alone or in combination with one or more additional catalysts. Exemplary metathesis catalysts include metal carbene catalysts based upon transition metals, for example, ruthenium, molybdenum, osmium, chromium, rhenium, and tungsten. The olefin metathesis catalyst for carrying out the cross-metathesis reactions of the disclosure is preferably a Group 8 transition metal complex having the structure of formula (III):
(III)
  in which the

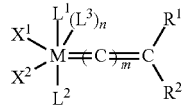

various substituents are as follows:
  M is a Group 8 transition metal;
  $L^1$, $L^2$ and $L^3$ are neutral electron donor ligands;
  n is 0 or 1, such that $L^3$ may or may not be present;
  m is 0, 1, or 2;
  $X^1$ and $X^2$ are anionic ligands; and
  $R^1$ and $R^2$ are independently selected from hydrogen, hydrocarbyl, substituted hydrocarbyl, heteroatom-containing hydrocarbyl, substituted heteroatom-containing hydrocarbyl, and functional groups,
  wherein any two or more of $X^1$, $X^2$, $L^1$, $L^2$, $L^3$, $R^1$, and $R^2$ can be taken together to form a cyclic group, and further wherein any one or more of $X^1$, $X^2$, $L^1$, $L^2$, $L^3$, $R^1$, and $R^2$ may be attached to a support.

Preferred catalysts contain Ru or Os as the Group 8 transition metal, with Ru particularly preferred.

Numerous embodiments of the catalysts useful in the reactions of the disclosure are described in more detail infra. For the sake of convenience, the catalysts are described in groups, but it should be emphasized that these groups are not meant to be limiting in any way. That is, any of the catalysts useful in the disclosure may fit the description of more than one of the groups described herein.

A first group of catalysts, then, are commonly referred to as $1^{st}$ Generation Grubbs-type catalysts, and have the structure of formula (III). For the first group of catalysts, M and m are as described above, and n, $X^1$, $X^2$, $L^1$, $L^2$, $L^3$, $R^1$, and $R^2$ are described as follows.

For the first group of catalysts, n is 0, and $L^1$ and $L^2$ are independently selected from phosphine, sulfonated phosphine, phosphite, phosphinite, phosphonite, arsine, stibine, ether, amine, amide, imine, sulfoxide, carboxyl, nitrosyl, pyridine, substituted pyridine, imidazole, substituted imidazole, pyrazine, and thioether. Exemplary ligands are trisubstituted phosphines.

$X^1$ and $X^2$ are anionic ligands, and may be the same or different, or are linked together to form a cyclic group, typically although not necessarily a five- to eight-membered ring. In preferred embodiments, $X^1$ and $X^2$ are each independently hydrogen, halide, or one of the following groups: $C_1$-$C_{20}$ alkyl, $C_5$-$C_{24}$ aryl, $C_1$-$C_{20}$ alkoxy, $C_5$-$C_{24}$ aryloxy, $C_2$-$C_{20}$ alkoxycarbonyl, $C_6$-$C_{24}$ aryloxycarbonyl, $C_2$-$C_{24}$ acyl, $C_2$-$C_{24}$ acyloxy, $C_1$-$C_{20}$ alkylsulfonato, $C_5$-$C_{24}$ arylsulfonato, $C_1$-$C_{20}$ alkylsulfanyl, $C_5$-$C_{24}$ arylsulfanyl, $C_1$-$C_{20}$ alkylsulfinyl, or $C_5$-$C_{24}$ arylsulfinyl. Optionally, $X^1$ and $X^2$ may be substituted with one or more moieties selected from $C_1$-$C_{12}$ alkyl, $C_1$-$C_{12}$ alkoxy, $C_5$-$C_{24}$ aryl, and halide, which may, in turn, with the exception of halide, be further substituted with one or more groups selected from halide, $C_1$-$C_6$ alkyl, $C_1$-$C_6$ alkoxy, and phenyl. In more preferred embodiments, $X^1$ and $X^2$ are halide, benzoate, $C_2$-$C_6$ acyl, $C_2$-$C_6$ alkoxycarbonyl, $C_1$-$C_6$ alkyl, phenoxy, $C_1$-$C_6$ alkoxy, $C_1$-$C_6$ alkylsulfanyl, aryl, or $C_1$-$C_6$ alkylsulfonyl. In even more preferred embodiments, $X^1$ and $X^2$ are each halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, or trifluoromethane-sulfonate. In the most preferred embodiments, $X^1$ and $X^2$ are each chloride.

$R^1$ and $R^2$ are independently selected from hydrogen, hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), heteroatom-containing hydrocarbyl (e.g., heteroatom-containing $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), and substituted heteroatom-containing hydrocarbyl (e.g., substituted heteroatom-containing $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), and functional groups. $R^1$ and $R^2$ may also be linked to form a cyclic group, which may be aliphatic or aromatic, and may contain substituents and/or heteroatoms. Generally, such a cyclic group will contain 4 to 12, preferably 5, 6, 7, or 8 ring atoms.

In preferred catalysts, $R^1$ is hydrogen and $R^2$ is selected from $C_1$-$C_{20}$ alkyl, $C_2$-$C_{20}$ alkenyl, and $C_5$-$C_{24}$ aryl, more preferably $C_1$-$C_6$ alkyl, $C_2$-$C_6$ alkenyl, and $C_5$-$C_{14}$ aryl. Still more preferably, $R^2$ is phenyl, vinyl, methyl, isopropyl, or t-butyl, optionally substituted with one or more moieties selected from $C_1$-$C_6$ alkyl, $C_1$-$C_6$ alkoxy, phenyl, and a functional group Fn as defined earlier herein. Most preferably, $R^2$ is phenyl or vinyl substituted with one or more moieties selected from methyl, ethyl, chloro, bromo, iodo, fluoro, nitro, dimethylamino, methyl, methoxy, and phenyl. Optimally, $R^2$ is phenyl or $-C=C(CH_3)_2$.

Any two or more (typically two, three, or four) of $X^1$, $X^2$, $L^1$, $L^2$, $L^3$, $R^1$, and $R^2$ can be taken together to form a cyclic group, as disclosed, for example, in U.S. Pat. No. 5,312,940 to Grubbs et al. When any of $X^1$, $X^2$, $L^1$, $L^2$, $L^3$, $R^1$, and $R^2$ are linked to form cyclic groups, those cyclic groups may contain 4 to 12, preferably 4, 5, 6, 7 or 8 atoms, or may comprise two or three of such rings, which may be either fused or linked. The cyclic groups may be aliphatic or aromatic, and may be heteroatom-containing and/or substituted. The cyclic group may, in some cases, form a bidentate ligand or a tridentate ligand. Examples of bidentate ligands include, but are not limited to, bisphosphines, dialkoxides, alkyldiketonates, and aryldiketonates.

A second group of catalysts, commonly referred to as $2^{nd}$ Generation Grubbs-type catalysts, have the structure of formula (III), wherein $L^1$ is a carbene ligand having the structure of formula (IV):

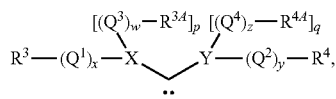

(IV)

such that the complex may have the structure of formula (V):

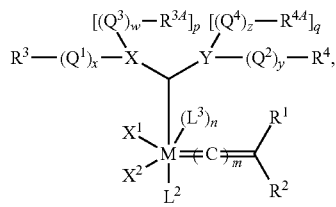

(V)

wherein M, m, n, $X^1$, $X^2$, $L^2$, $L^3$, $R^1$, and $R^2$ are as defined for the first group of catalysts, and the remaining substituents are as follows.

X and Y are heteroatoms typically selected from N, O, S, and P. Since O and S are divalent, p is necessarily zero when X is O or S, and q is necessarily zero when Y is O or S. However, when X is N or P, then p is 1, and when Y is N or P, then q is 1. In a preferred embodiment, both X and Y are N.

$Q^1$, $Q^2$, $Q^3$, and $Q^4$ are linkers, e.g., hydrocarbylene (including substituted hydrocarbylene, heteroatom-containing hydrocarbylene, and substituted heteroatom-containing hydrocarbylene, such as substituted and/or heteroatom-containing alkylene) or —(CO)—, and w, x, y, and z are independently zero or 1, meaning that each linker is optional. Preferably, w, x, y, and z are all zero. Further, two or more substituents on adjacent atoms within $Q^1$, $Q^2$, $Q^3$, and $Q^4$ may be linked to form an additional cyclic group.

$R^3$, $R^{3A}$, $R^4$, and $R^{4A}$ are independently selected from hydrogen, hydrocarbyl, substituted hydrocarbyl, heteroatom-containing hydrocarbyl, and substituted heteroatom-containing hydrocarbyl.

In addition, any two or more of $X^1$, $X^2$, $L^1$, $L^2$, $L^3$, $R^1$, $R^2$, $R^3$, $R^{3A}$, $R^4$, and $R^{4A}$ can be taken together to form a cyclic group, and any one or more of $X^1$, $X^2$, $L^1$, $L^2$, $L^3$, $R^1$, $R^2$, $R^3$, $R^{3A}$, $R^4$, and $R^{4A}$ may be attached to a support.

Preferably, $R^{3A}$ and $R^{4A}$ are linked to form a cyclic group so that the carbene ligand is an heterocyclic carbene and preferably an N-heterocyclic carbene, such as the N-heterocylic carbene having the structure of formula (VI):

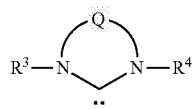

(VI)

where $R^3$ and $R^4$ are defined above, with preferably at least one of $R^3$ and $R^4$, and more preferably both $R^3$ and $R^4$, being alicyclic or aromatic of one to about five rings, and optionally containing one or more heteroatoms and/or substituents. Q is a linker, typically a hydrocarbylene linker, including substituted hydrocarbylene, heteroatom-containing hydrocarbylene, and substituted heteroatom-containing hydrocarbylene linkers, wherein two or more substituents on adjacent atoms within Q may also be linked to form an additional cyclic structure, which may be similarly substituted to provide a fused polycyclic structure of two to about five cyclic groups. Q is often, although again not necessarily, a two-atom linkage or a three-atom linkage.

Examples of N-heterocyclic carbene ligands suitable as $L^1$ thus include, but are not limited to, the following:

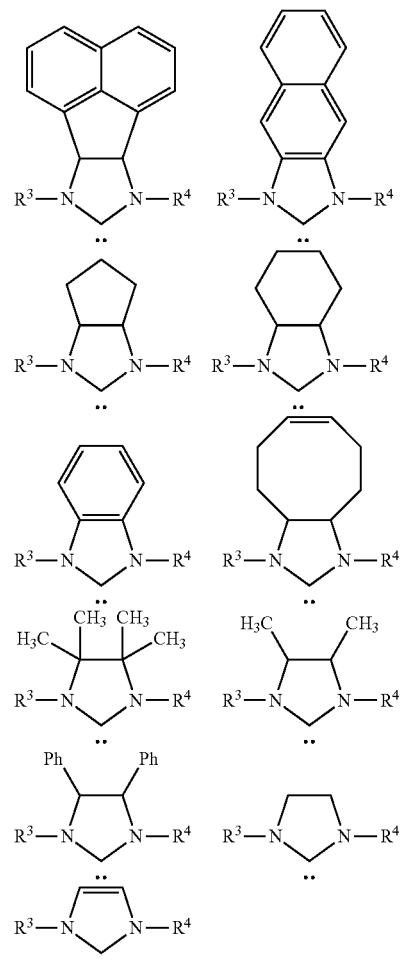

When M is ruthenium, then, the preferred complexes have the structure of formula (VII).

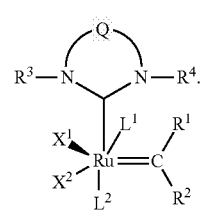

(VII)

In a more preferred embodiment, Q is a two-atom linkage having the structure —$CR^{11}R^{12}$—$CR^{13}R^{14}$— or —$CR^{11}$=$CR^{13}$—, preferably —$CR^{11}R^{12}$—$CR^{13}R^{14}$—, wherein $R^{11}$, $R^{12}$, $R^{13}$, and $R^{14}$ are independently selected from hydrogen, hydrocarbyl, substituted hydrocarbyl, heteroatom-containing hydrocarbyl, substituted heteroatom-containing hydrocarbyl, and functional groups. Examples of functional groups here include carboxyl, $C_1$-$C_{20}$ alkoxy, $C_5$-$C_{24}$ aryloxy, $C_2$-$C_{20}$ alkoxycarbonyl, $C_6$-$C_{24}$ alkoxycarbonyl, $C_2$-$C_{24}$ acyloxy, $C_1$-$C_{20}$ alkylthio, $C_5$-$C_{24}$ arylthio, $C_1$-$C_{20}$ alkylsulfonyl, and $C_1$-$C_{20}$ alkylsulfinyl, optionally substituted with one or more moieties selected from $C_1$-$C_{12}$ alkyl, $C_1$-$C_{12}$ alkoxy, $C_5$-$C_{14}$ aryl, hydroxyl, sulfhydryl, formyl, and halide. $R^{11}$, $R^{12}$, $R^{13}$, and $R^{14}$ are preferably independently selected from hydrogen, $C_1$-$C_{12}$ alkyl, substituted $C_1$-$C_{12}$ alkyl, $C_1$-$C_{12}$ heteroalkyl, substituted $C_1$-$C_{12}$ heteroalkyl, phenyl, and substituted phenyl. Alternatively, any two of $R^{11}$, $R^{12}$, $R^{13}$, and $R^{14}$ may be linked together to form a substituted or unsubstituted, saturated or unsaturated ring structure, e.g., a $C_4$-$C_{12}$ alicyclic group or a $C_5$ or $C_6$ aryl group, which may itself be substituted, e.g., with linked or fused alicyclic or aromatic groups, or with other substituents.

When $R^3$ and $R^4$ are aromatic, they are typically although not necessarily composed of one or two aromatic rings, which may or may not be substituted, e.g., $R^3$ and $R^4$ may be phenyl, substituted phenyl, biphenyl, substituted biphenyl, or the like. In one preferred embodiment, $R^3$ and $R^4$ are the same and are each unsubstituted phenyl or phenyl substituted with up to three substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide. Preferably, any substituents present are hydrogen, $C_1$-$C_{12}$ alkyl, $C_1$-$C_{12}$ alkoxy, $C_5$-$C_{14}$ aryl, substituted $C_5$-$C_{14}$ aryl, or halide. As an example, $R^3$ and $R^4$ are mesityl.

In a third group of catalysts having the structure of formula (III), M, m, n, $X^1$, $X^2$, $R^1$, and $R^2$ are as defined for the first group of catalysts, $L^1$ is a strongly coordinating neutral electron donor ligand such as any of those described for the first and second groups of catalysts, and $L^2$ and $L^3$ are weakly coordinating neutral electron donor ligands in the form of optionally substituted heterocyclic groups. Again, n is zero or 1, such that $L^3$ may or may not be present. Generally, in the third group of catalysts, $L^2$ and $L^3$ are optionally substituted five- or six-membered monocyclic groups containing 1 to 4, preferably 1 to 3, most preferably 1 to 2 heteroatoms, or are optionally substituted bicyclic or polycyclic structures composed of 2 to 5 such five- or six-membered monocyclic groups. If the heterocyclic group is substituted, it should not be substituted on a coordinating heteroatom, and any one cyclic moiety within a heterocyclic group will generally not be substituted with more than 3 substituents.

For the third group of catalysts, examples of $L^2$ and $L^3$ include, without limitation, heterocycles containing nitrogen, sulfur, oxygen, or a mixture thereof.

Examples of nitrogen-containing heterocycles appropriate for $L^2$ and $L^3$ include pyridine, bipyridine, pyridazine, pyrimidine, bipyridamine, pyrazine, 1,3,5-triazine, 1,2,4-triazine, 1,2,3-triazine, pyrrole, 2H-pyrrole, 3H-pyrrole, pyrazole, 2H-imidazole, 1,2,3-triazole, 1,2,4-triazole, indole, 3H-indole, 1H-isoindole, cyclopenta(b)pyridine, indazole, quinoline, bisquinoline, isoquinoline, bisisoquinoline, cinnoline, quinazoline, naphthyridine, piperidine, piperazine, pyrrolidine, pyrazolidine, quinuclidine, imidazolidine, picolylimine, purine, benzimidazole, bisimidazole, phenazine, acridine, and carbazole.

Examples of sulfur-containing heterocycles appropriate for $L^2$ and $L^3$ include thiophene, 1,2-dithiole, 1,3-dithiole, thiepin, benzo(b)thiophene, benzo(c)thiophene, thionaphthene, dibenzothiophene, 2H-thiopyran, 4H-thiopyran, and thioanthrene.

Examples of oxygen-containing heterocycles appropriate for $L^2$ and $L^3$ include 2H-pyran, 4H-pyran, 2-pyrone, 4-pyrone, 1,2-dioxin, 1,3-dioxin, oxepin, furan, 2H-1-benzopyran, coumarin, coumarone, chromene, chroman-4-one, isochromen-1-one, isochromen-3-one, xanthene, tetrahydrofuran, 1,4-dioxan, and dibenzofuran.

Examples of mixed heterocycles appropriate for $L^2$ and $L^3$ include isoxazole, oxazole, thiazole, isothiazole, 1,2,3-oxadiazole, 1,2,4-oxadiazole, 1,3,4-oxadiazole, 1,2,3,4-oxatriazole, 1,2,3,5-oxatriazole, 3H-1,2,3-dioxazole, 3H-1,2-oxathiole, 1,3-oxathiole, 4H-1,2-oxazine, 2H-1,3-oxazine, 1,4-oxazine, 1,2,5-oxathiazine, o-isooxazine, phenoxazine, phenothiazine, pyrano[3,4-b]pyrrole, indoxazine, benzoxazole, anthranil, and morpholine.

Preferred $L^2$ and $L^3$ ligands are aromatic nitrogen-containing and oxygen-containing heterocycles, and particularly preferred $L^2$ and $L^3$ ligands are monocyclic N-heteroaryl ligands that are optionally substituted with 1 to 3, preferably 1 or 2, substituents. Specific examples of particularly preferred $L^2$ and $L^3$ ligands are pyridine and substituted pyridines, such as 3-bromopyridine, 4-bromopyridine, 3,5-dibromopyridine, 2,4,6-tribromopyridine, 2,6-dibromopyridine, 3-chloropyridine, 4-chloropyridine, 3,5-dichloropyridine, 2,4,6-trichloropyridine, 2,6-dichloropyridine, 4-iodopyridine, 3,5-diiodopyridine, 3,5-dibromo-4-methylpyridine, 3,5-dichloro-4-methylpyridine, 3,5-dimethyl-4-bromopyridine, 3,5-dimethylpyridine, 4-methylpyridine, 3,5-diisopropylpyridine, 2,4,6-trimethylpyridine, 2,4,6-triisopropylpyridine, 4-(tert-butyl)pyridine, 4-phenylpyridine, 3,5-diphenylpyridine, 3,5-dichloro-4-phenylpyridine, and the like.

In general, any substituents present on $L^2$ and/or $L^3$ are selected from halo, $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, substituted $C_5$-$C_{24}$ heteroaryl, $C_6$-$C_{24}$ alkaryl, substituted $C_6$-$C_{24}$ alkaryl, $C_6$-$C_{24}$ heteroalkaryl, substituted $C_6$-$C_{24}$ heteroalkaryl, $C_6$-$C_{24}$ aralkyl, substituted $C_6$-$C_{24}$ aralkyl, $C_6$-$C_{24}$ heteroaralkyl, substituted $C_6$-$C_{24}$ heteroaralkyl, and functional groups, with suitable functional groups including, without limitation, $C_1$-$C_{20}$ alkoxy, $C_5$-$C_{24}$ aryloxy, $C_2$-$C_{20}$ alkylcarbonyl, $C_6$-$C_{24}$ aryl carbonyl, $C_2$-$C_{20}$ alkylcarbonyloxy, $C_6$-$C_{24}$ aryl carbonyloxy, $C_2$-$C_{20}$ alkoxycarbonyl, $C_6$-$C_{24}$ aryloxycarbonyl, halocarbonyl, $C_2$-$C_{20}$ alkylcarbonato, $C_6$-$C_{24}$ arylcarbonato, carboxy, carboxylato, carbamoyl, mono-($C_1$-$C_{20}$ alkyl)-substituted carbamoyl, di-($C_1$-$C_{20}$ alkyl)-substituted carbamoyl, di-N—($C_1$-$C_{20}$ alkyl), N—($C_5$-$C_{24}$ aryl)-substituted carbamoyl, mono-($C_5$-$C_{24}$ aryl)-substituted carbamoyl, di-($C_6$-$C_{24}$ aryl)-substituted carbamoyl, thiocarbamoyl, mono-($C_1$-$C_{20}$ alkyl)-substituted thiocarbamoyl, di-($C_1$-$C_{20}$ alkyl)-substituted thiocarbamoyl, di-N—($C_1$-$C_{20}$ alkyl)-N—($C_6$-$C_{24}$ aryl)-substituted thiocarbamoyl, mono-($C_6$-$C_{24}$ aryl)-substituted thiocarbamoyl, di-($C_6$-$C_{24}$ aryl)-substituted thiocarbamoyl, carbamido, formyl, thioformyl, amino, mono-($C_1$-$C_{20}$ alkyl)-substituted amino, di-($C_1$-$C_{20}$ alkyl)-substituted amino, mono-($C_5$-$C_{24}$ aryl)-substituted amino, di-($C_5$-$C_{24}$ aryl)-substituted amino, di-N—($C_1$-$C_{20}$ alkyl), N—($C_5$-$C_{24}$ aryl)-substituted amino, $C_2$-$C_{20}$ alkylamido, $C_6$-$C_{24}$ arylamido, imino, $C_1$-$C_{20}$ alkylimino, $C_5$-$C_{24}$ arylimino, nitro, and nitroso. In addition, two adjacent substituents may be taken together to form a ring, generally a five- or six-membered alicyclic or aryl ring, optionally containing 1 to 3 heteroatoms and 1 to 3 substituents as above.

Preferred substituents on $L^2$ and $L^3$ include, without limitation, halo, $C_1$-$C_{12}$ alkyl, substituted $C_1$-$C_{12}$ alkyl, $C_1$-$C_{12}$ heteroalkyl, substituted $C_1$-$C_{12}$ heteroalkyl, $C_5$-$C_{14}$ aryl, substituted $C_5$-$C_{14}$ aryl, $C_6$-$C_{14}$ heteroaryl, substituted $C_5$-$C_{14}$ heteroaryl, $C_6$-$C_{16}$ alkaryl, substituted $C_6$-$C_{16}$ alkaryl, $C_6$-$C_{16}$ heteroalkaryl, substituted $C_6$-$C_{16}$ heteroalkaryl, $C_6$-$C_{16}$ aralkyl, substituted $C_6$-$C_{16}$ aralkyl, $C_6$-$C_{16}$ heteroaralkyl, substituted $C_6$-$C_{16}$ heteroaralkyl, $C_1$-$C_{12}$ alkoxy, $C_5$-$C_{14}$ aryloxy, $C_2$-$C_{12}$ alkylcarbonyl, $C_6$-$C_{14}$ arylcarbonyl, $C_2$-$C_{12}$ alkylcarbonyloxy, $C_6$-$C_{14}$ arylcarbonyloxy, $C_2$-$C_{12}$ alkoxycarbonyl, $C_6$-$C_{14}$ aryloxycarbonyl, halocarbonyl, formyl, amino, mono-($C_1$-$C_{12}$ alkyl)-substituted amino, di-($C_1$-$C_{12}$ alkyl)-substituted amino, mono-($C_5$-$C_{14}$ aryl)-substituted amino, di-($C_5$-$C_{14}$ aryl)-substituted amino, and nitro.

Of the foregoing, the most preferred substituents are halo, $C_1$-$C_6$ alkyl, $C_1$-$C_6$ haloalkyl, $C_1$-$C_6$ alkoxy, phenyl, substituted phenyl, formyl, N,N-di$C_1$-$C_6$ alkyl)amino, nitro, and nitrogen heterocycles as described above (including, for example, pyrrolidine, piperidine, piperazine, pyrazine, pyrimidine, pyridine, pyridazine, etc.).

$L^2$ and $L^3$ may also be taken together to form a bidentate or multidentate ligand containing two or more, generally two, coordinating heteroatoms such as N, O, S, or P, with preferred such ligands being diimine ligands of the Brookhart type. One representative bidentate ligand has the structure of formula (VIII):

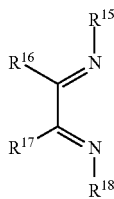

(VIII)

wherein $R^{15}$, $R^{16}$, $R^{17}$, and $R^{18}$ hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), heteroatom-containing hydrocarbyl (e.g., $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or substituted heteroatom-containing hydrocarbyl (e.g., substituted $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or (1) $R^{15}$ and $R^{16}$, (2) $R^{17}$ and $R^{18}$, (3) $R^{16}$ and $R^{17}$, or (4) both $R^{15}$ and $R^{16}$, and $R^{17}$ and $R^{18}$, may be taken together to form a ring, i.e., an N-heterocycle. Preferred cyclic groups in such a case are five- and six-membered rings, typically aromatic rings.

In a fourth group of catalysts that have the structure of formula (III), two of the substituents are taken together to form a bidentate ligand or a tridentate ligand. Examples of bidentate ligands include, but are not limited to, bisphosphines, dialkoxides, alkyldiketonates, and aryldiketonates. Specific examples include —P(Ph)$_2$CH$_2$CH$_2$P(Ph)$_2$—, —As (Ph)$_2$CH$_2$CH$_2$As(Ph$_2$)—, —P(Ph)$_2$CH$_2$CH$_2$C(CF$_3$)$_2$O—, binaphtholate dianions, pinacolate dianions, —P(CH$_3$)$_2$ (CH$_2$)$_2$P(CH$_3$)$_2$—, and —OC(CH$_3$)$_2$(CH$_3$)$_2$CO—. Preferred bidentate ligands are —P(Ph)$_2$CH$_2$CH$_2$P(Ph)$_2$— and —P(CH$_3$)$_2$(CH$_2$)$_2$P(CH$_3$)$_2$—. Tridentate ligands include, but are not limited to, (CH$_3$)$_2$NCH$_2$CH$_2$P(Ph)CH$_2$CH$_2$N(CH$_3$)$_2$. Other preferred tridentate ligands are those in which any three of $X^1$, $X^2$, $L^1$, $L^2$, $L^3$, $R^1$ and $R^2$ (e.g., $X^1$, $L^1$, and $L^2$) are taken together to be cyclopentadienyl, indenyl, or fluorenyl, each optionally substituted with $C_2$-$C_{20}$ alkenyl, $C_2$-$C_{20}$ alkynyl, $C_1$-$C_{20}$ alkyl, $C_5$-$C_{20}$ aryl, $C_1$-$C_{20}$ alkoxy, $C_2$-$C_{20}$ alkenyloxy, $C_2$-$C_{20}$ alkynyloxy, $C_5$-$C_{20}$ aryloxy, $C_2$-$C_{20}$ alkoxycarbonyl, $C_1$-$C_{20}$ alkylthio, $C_1$-$C_{20}$ alkylsulfonyl, or $C_1$-$C_{20}$ alkylsulfinyl, each of which may be further substituted with $C_1$-$C_6$ alkyl, halide, $C_1$-$C_6$ alkoxy or with a phenyl group optionally substituted with halide, $C_1$-$C_6$ alkyl, or $C_1$-$C_6$ alkoxy. More preferably, in compounds of this type, X, $L^1$, and $L^2$ are taken together to be cyclopentadienyl or indenyl, each optionally substituted with vinyl, $C_1$-$C_{10}$ alkyl, $C_5$-$C_{20}$ aryl, $C_1$-$C_{10}$ carboxylate, $C_2$-$C_{10}$ alkoxycarbonyl, $C_1$-$C_{10}$ alkoxy, or $C_5$-$C_{20}$ aryloxy, each optionally substituted with $C_1$-$C_6$ alkyl, halide, $C_1$-$C_6$ alkoxy or with a phenyl group optionally substituted with halide, $C_1$-$C_6$ alkyl or $C_1$-$C_6$ alkoxy. Most preferably, X, $L^1$ and $L^2$ may be taken together to be cyclopentadienyl, optionally substituted with vinyl, hydrogen, methyl, or phenyl. Tetradentate ligands include, but are not limited to O$_2$C (CH$_2$)$_2$P(Ph)(CH$_2$)$_2$P(Ph)(CH$_2$)$_2$CO$_2$, phthalocyanines, and porphyrins.

Complexes wherein $L^2$ and $R^2$ are linked are examples of the fourth group of catalysts, and are commonly called "Grubbs-Hoveyda" catalysts. Examples of Grubbs-Hoveyda-type catalysts include the following:

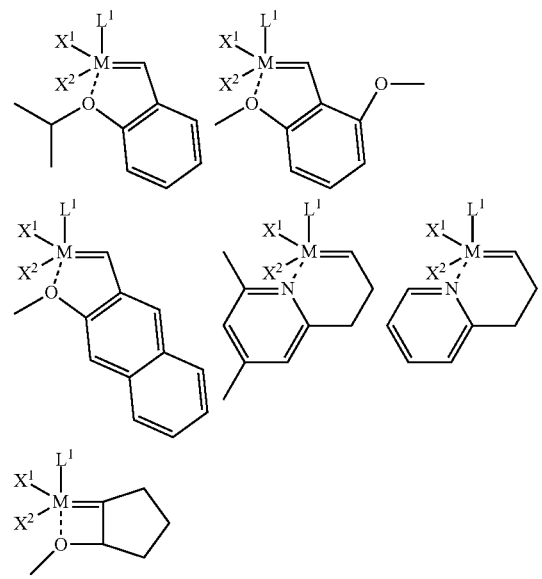

wherein $L^1$, $X^1$, $X^2$, and M are as described for any of the other groups of catalysts.

In addition to the catalysts that have the structure of formula (III), as described above, other transition metal carbene complexes include, but are not limited to:

neutral ruthenium or osmium metal carbene complexes containing metal centers that are formally in the +2 oxidation state, have an electron count of 16, are penta-coordinated, and are of the general formula (IX);

neutral ruthenium or osmium metal carbene complexes containing metal centers that are formally in the +2 oxidation state, have an electron count of 18, are hexa-coordinated, and are of the general formula (X);

cationic ruthenium or osmium metal carbene complexes containing metal centers that are formally in the +2 oxidation state, have an electron count of 14, are tetra-coordinated, and are of the general formula (XI); and cationic ruthenium or osmium metal carbene complexes containing metal centers that are formally in the +2 oxidation state, have an electron count of 14, are tetra-coordinated, and are of the general formula (XII):

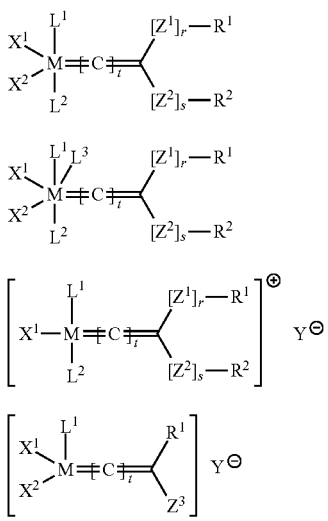

wherein: $X^1$, $X^2$, $L^1$, $L^2$, n, $L^3$, $R^1$, and $R^2$ are as defined for any of the previously defined four groups of catalysts; r and s are independently zero or 1; t is an integer in the range of zero to 5;

Y is any non-coordinating anion (e.g., a halide ion, $BF_4^-$, etc.); $Z^1$ and $Z^2$ are independently selected from —O—, —S—, —$NR^2$—, —$PR^2$—, —P(=O)$R^2$—, —P(O$R^2$)—, —P(=O)(O$R^2$)—, —C(=O)—, —C(=O)O—, —OC(=O)—, —OC(=O)O—, —S(=O)—, and —S(=O)$_2$—; $Z^3$ is any cationic moiety such as —P($R^2$)$_3^+$ or —N($R^2$)$_3^+$; and any two or more of $X^1$, $X^2$, $L^1$, $L^2$, $L^3$, n, $Z^1$, $Z^2$, $Z^3$, $R^1$, and $R^2$ may be taken together to form a cyclic group, e.g., a multidentate ligand, and wherein any one or more of $X^1$, $X^2$, $L^1$, $L^2$, n, $L^3$, $Z^1$, $Z^2$, $Z^3$, $R^1$, and $R^2$ may be attached to a support.

Other suitable complexes include Group 8 transition metal carbenes bearing a cationic substituent, such as are disclosed in U.S. Pat. No. 7,365,140 (Piers et al.) having the general structure (XIII):

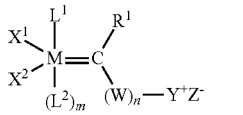

wherein:
M is a Group 8 transition metal;
$L^1$ and $L^2$ are neutral electron donor ligands;
$X^1$ and $X^2$ are anionic ligands;
$R^1$ is hydrogen, $C_1$-$C_{12}$ hydrocarbyl, or substituted $C_1$-$C_{12}$ hydrocarbyl; W is an optionally substituted and/or heteroatom-containing $C_1$-$C_{20}$ hydrocarbylene linkage;
Y is a positively charged Group 15 or Group 16 element substituted with hydrogen, $C_1$-$C_{12}$ hydrocarbyl, substituted $C_1$-$C_{12}$ hydrocarbyl; heteroatom-containing $C_1$-$C_{12}$ hydrocarbyl, or substituted heteroatom-containing hydrocarbyl;
$Z^-$ is a negatively charged counterion;
m is zero or 1; and
n is zero or 1;

wherein any two or more of $L^1$, $L^2$, $X^1$, $X^2$, $R^1$, W, and Y can be taken together to form a cyclic group.

Each of M, $L^1$, $L^2$, $X^1$, and $X^2$ in structure (XIII) may be as previously defined herein.

W is an optionally substituted and/or heteroatom-containing $C_1$-$C_{20}$ hydrocarbylene linkage, typically an optionally substituted $C_1$-$C_{12}$ alkylene linkage, e.g., —(CH$_2$)$_i$— where i is an integer in the range of 1 to 12 inclusive and any of the hydrogen atoms may be replaced with a non-hydrogen substituent as described earlier herein with regard to the definition of the term "substituted." The subscript n is zero or 1, meaning that W may or may not be present. In a preferred embodiment, n is zero.

Y is a positively charged Group 15 or Group 16 element substituted with hydrogen, $C_1$-$C_{12}$ hydrocarbyl, substituted $C_1$-$C_{12}$ hydrocarbyl, heteroatom-containing $C_1$-$C_{12}$ hydrocarbyl, or substituted heteroatom-containing hydrocarbyl. Preferably, Y is a $C_1$-$C_{12}$ hydrocarbyl-substituted, positively charged Group 15 or Group 16 element. Representative Y groups include P($R^2$)$_3$, P($R^2$)$_3$, As($R^2$)$_3$, S($R^2$)$_2$, O($R^2$)$_2$, where the $R^2$ are independently selected from $C_1$-$C_{12}$ hydrocarbyl; within these, preferred Y groups are phosphines of the structure P($R^2$)$_3$ wherein the $R^2$ are independently selected from $C_1$-$C_{12}$ alkyl and aryl, and thus include, for example, methyl, ethyl, n-propyl, isopropyl, n-butyl, isobutyl, t-butyl, cyclopentyl, cyclohexyl, and phenyl. Y can also be a heterocyclic group containing the positively charged Group 15 or Group 16 element. For instance, when the Group 15 or Group 16 element is nitrogen, Y may be an optionally substituted pyridinyl, pyrazinyl, or imidazolyl group.

$Z^-$ is a negatively charged counterion associated with the cationic complex, and may be virtually any anion, so long as the anion is inert with respect to the components of the complex and the reactants and reagents used in the metathesis reaction catalyzed. Preferred $Z^-$ moieties are weakly coordinating anions, such as, for instance, [B($C_6F_5$)$_4$]$^-$, [BF$_4$]$^-$, [B($C_6H_6$)$_4$]$^-$, [CF$_3$S(O)$_3$]$^-$, [PF$_6$]$^-$, [SbF$_6$]$^-$, [AlCl$_4$]$^-$, [FSO$_3$]$^-$, [CB$_{11}$H$_6$Cl$_6$]$^-$, [CB$_{11}$H$_6$Br$_6$]$^-$, and [SO$_3$F:SbF$_5$]$^-$. Preferred anions suitable as $Z^-$ are of the formula B($R^{15}$)$_4^-$ where $R^{15}$ is fluoro, aryl, or perfluorinated aryl, typically fluoro or perfluorinated aryl. Most preferred anions suitable as $Z^-$ are BF$_4^-$ and B($C_6F_5$)$^-$, optimally the latter.

It should be emphasized that any two or more of $X^1$, $X^2$, $L^1$, $L^2$, $R^1$, W, and Y can be taken together to form a cyclic group, as disclosed, for example, in U.S. Pat. No. 5,312,940 to Grubbs et al. When any of $X^1$, $X^2$, $L^1$, $L^2$, $R^1$, W and Y are linked to form cyclic groups, those cyclic groups may be five- or six-membered rings, or may comprise two or three five- or six-membered rings, which may be either fused or linked. The cyclic groups may be aliphatic or aromatic, and may be heteroatom-containing and/or substituted, as explained in part (I) of this section.

One group of exemplary catalysts encompassed by the structure of formula (XIII) are those wherein m and n are zero, such that the complex has the structure of formula (XIV):

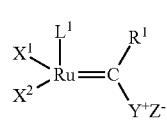

Possible and preferred $X^1$, $X^2$, and $L^1$ ligands are as described earlier with respect to complexes of formula (I), as are possible and preferred Y⁺ and Z⁻ moieties. M is Ru or Os, preferably Ru, and $R^1$ is hydrogen or $C_1$-$C_{12}$ alkyl, preferably hydrogen.

In formula (XIV)-type catalysts, $L^1$ is preferably a heteroatom-containing carbene ligand having the structure of formula (XV):

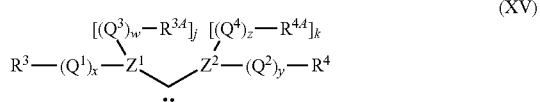
(XV)

such that complex (XIV) has the structure of formula (XVI):

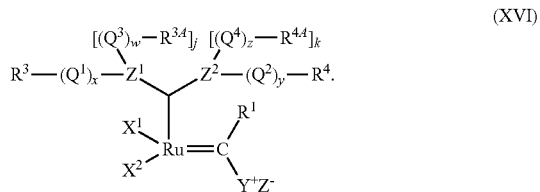
(XVI)

wherein $X^1$, $X^2$, $R^1$, $R^2$, Y, and Z are as defined previously, and the remaining substituents are as follows:

$Z^1$ and $Z^2$ are heteroatoms typically selected from N, O, S, and P. Since O and S are divalent, j is necessarily zero when $Z^1$ is O or $S_3$ and k is necessarily zero when $Z^2$ is O or S. However, when $Z^1$ is N or P, then j is 1, and when $Z^2$ is N or P, then k is 1. In a preferred embodiment, both $Z^1$ and $Z^2$ are N.

$Q^1$, $Q^2$, $Q^3$, and $Q^4$ are linkers, e.g., $C_1$-$C_{12}$ hydrocarbylene, substituted $C_1$-$C_{12}$ hydrocarbylene, heteroatom-containing $C_1$-$C_{12}$ hydrocarbylene, substituted heteroatom-containing $C_1$-$C_{12}$ hydrocarbylene, or —(CO)—, and w, x, y, and z are independently zero or 1, meaning that each linker is optional. Preferably, w, x, y, and z are all zero.

$R^3$, $R^{3A}$, $R^4$, and $R^{4A}$ are independently selected from hydrogen, hydrogen, $C_1$-$C_{20}$ hydrocarbyl, substituted $C_1$-$C_{20}$ hydrocarbyl, heteroatom-containing $C_1$-$C_{20}$ hydrocarbyl, and substituted heteroatom-containing $C_1$-$C_{20}$ hydrocarbyl.

Preferably, w, x, y, and z are zero, $Z^1$ and $Z^1$ are N, and $R^{3A}$ and $R^{4A}$ are linked to form -Q-, such that the complex has the structure of formula (XVII):

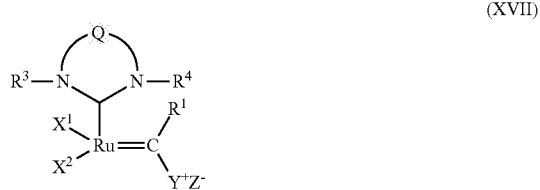
(XVII)

wherein $R^3$ and $R^4$ are defined above, with preferably at least one of $R^3$ and $R^4$, and more preferably both $R^3$ and $R^4$, being alicyclic or aromatic of one to about five rings, and optionally containing one or more heteroatoms and/or substituents. Q is a linker, typically a hydrocarbylene linker, including $C_1$-$C_{12}$ hydrocarbylene, substituted $C_1$-$C_{12}$ hydrocarbylene, heteroatom-containing $C_1$-$C_{12}$ hydrocarbylene, or substituted heteroatom-containing $C_1$-$C_{12}$ hydrocarbylene linker, wherein two or more substituents on adjacent atoms within Q may be linked to form an additional cyclic structure, which may be similarly substituted to provide a fused polycyclic structure of two to about five cyclic groups. Q is often, although not necessarily, a two-atom linkage or a three-atom linkage, e.g., —CH₂—CH₂—, —CH(Ph)—CH(Ph)— where Ph is phenyl; =CR—N—, giving rise to an unsubstituted (when R=H) or substituted (R=other than H) triazolyl group; or —CH₂—SiR₂—CH₂— (where R is H, alkyl, alkoxy, etc.).

In a more preferred embodiment, Q is a two-atom linkage having the structure —CR⁸R⁹—CR¹⁰R¹¹— or —CR⁸=CR¹⁰—, preferably —CR⁸R⁹—CR¹⁰R¹¹—, wherein $R^8$, $R^9$, $R^{10}$, and $R^{11}$ are independently selected from hydrogen, $C_1$-$C_{12}$ hydrocarbyl, substituted $C_1$-$C_{12}$ hydrocarbyl, heteroatom-containing $C_1$-$C_{12}$ hydrocarbyl, substituted heteroatom-containing $C_1$-$C_{12}$ hydrocarbyl, and functional groups as defined in part (I) of this section. Examples of functional groups here include carboxyl, $C_1$-$C_{20}$ alkoxy, $C_5$-$C_{20}$ aryloxy, $C_2$-$C_{20}$ alkoxycarbonyl, $C_2$-$C_{20}$ alkoxycarbonyl, $C_2$-$C_{20}$ acyloxy, $C_1$-$C_{20}$ alkylthio, $C_5$-$C_{20}$ arylthio, $C_1$-$C_{20}$ alkylsulfonyl, and $C_1$-$C_{20}$ alkylsulfinyl, optionally substituted with one or more moieties selected from $C_1$-$C_{10}$ alkyl, $C_1$-$C_{10}$ alkoxy, $C_5$-$C_{20}$ aryl, hydroxyl, sulfhydryl, formyl, and halide. Alternatively, any two of $R^8$, $R^9$, $R^{10}$, and $R^{11}$ may be linked together to form a substituted or unsubstituted, saturated or unsaturated ring structure, e.g., a $C_4$-$C_{12}$ alicyclic group or a $C_5$ or $C_6$ aryl group, which may itself be substituted, e.g., with linked or fused alicyclic or aromatic groups, or with other substituents.

Further details concerning such formula (XIII) complexes, as well as associated preparation methods, may be obtained from U.S. Pat. No. 7,365,140, herein incorporated by reference.

As is understood in the field of catalysis, suitable solid supports for any of the catalysts described herein may be of synthetic, semi-synthetic, or naturally occurring materials, which may be organic or inorganic, e.g., polymeric, ceramic, or metallic. Attachment to the support will generally, although not necessarily, be covalent, and the covalent linkage may be direct or indirect, if indirect, typically through a functional group on a support surface.

Non-limiting examples of catalysts that may be used in the reactions of this disclosure are described in detail in PCT/US2008/009635, pg. 38-45, incorporated herein by reference.

Techniques for using the metathesis catalysts are known in the art (see, for example, U.S. Pat. Nos. 7,102,047; 6,794,534; 6,696,597; 6,414,097; 6,306,988; 5,922,863; 5,750,815; and metathesis catalysts with ligands in U.S. Publication No. 2007/0004917 A1), all incorporated by reference herein in their entireties. A number of the metathesis catalysts as shown are manufactured by Materia, Inc. (Pasadena, Calif.).

Additional exemplary metathesis catalysts include, without limitation, metal carbene complexes selected from the group consisting of molybdenum, osmium, chromium, rhenium, and tungsten. The term "complex" refers to a metal atom, such as a transition metal atom, with at least one ligand or complexing agent coordinated or bound thereto. Such a ligand typically is a Lewis base in metal carbene complexes useful for alkyne- or alkene-metathesis. Typical examples of such ligands include phosphines, halides and stabilized carbenes. Some metathesis catalysts may employ plural metals or metal co-catalysts (e.g., a catalyst comprising a tungsten halide, a tetraalkyl tin compound, and an organoaluminum compound).

An immobilized catalyst can be used for the metathesis process. An immobilized catalyst is a system comprising a catalyst and a support, the catalyst associated with the support. Exemplary associations between the catalyst and the support may occur by way of chemical bonds or weak interactions (e.g. hydrogen bonds, donor acceptor interactions) between the catalyst, or any portions thereof, and the support or any portions thereof. Support is intended to include any material suitable to support the catalyst. Typically, immobilized catalysts are solid phase catalysts that act on liquid or gas phase reactants and products. Exemplary supports are polymers, silica or alumina. Such an immobilized catalyst may be used in a flow process. An immobilized catalyst can simplify purification of products and recovery of the catalyst so that recycling the catalyst may be more convenient.

The metathesis process can be conducted under any conditions adequate to produce the desired metathesis products. For example, stoichiometry, atmosphere, solvent, temperature and pressure can be selected to produce a desired product and to minimize undesirable byproducts. The metathesis process may be conducted under an inert atmosphere. Similarly, if a reagent is supplied as a gas, an inert gaseous diluent can be used. The inert atmosphere or inert gaseous diluent typically is an inert gas, meaning that the gas does not interact with the metathesis catalyst to substantially impede catalysis. For example, particular inert gases are selected from the group consisting of helium, neon, argon, nitrogen and combinations thereof.

Similarly, if a solvent is used, the solvent chosen may be selected to be substantially inert with respect to the metathesis catalyst. For example, substantially inert solvents include, without limitation, aromatic hydrocarbons, such as benzene, toluene, xylenes, etc.; halogenated aromatic hydrocarbons, such as chlorobenzene and dichlorobenzene; aliphatic solvents, including pentane, hexane, heptane, cyclohexane, etc.; and chlorinated alkanes, such as dichloromethane, chloroform, dichloroethane, etc.

In certain embodiments, a ligand may be added to the metathesis reaction mixture. In many embodiments using a ligand, the ligand is selected to be a molecule that stabilizes the catalyst, and may thus provide an increased turnover number for the catalyst. In some cases the ligand can alter reaction selectivity and product distribution. Examples of ligands that can be used include Lewis base ligands, such as, without limitation, trialkylphosphines, for example tricyclohexylphosphine and tributyl phosphine; triarylphosphines, such as triphenylphosphine; diarylalkylphosphines, such as, diphenylcyclohexylphosphine; pyridines, such as 2,6-dimethylpyridine, 2,4,6-trimethylpyridine; as well as other Lewis basic ligands, such as phosphine oxides and phosphinites. Additives also may be present during metathesis that increase catalyst lifetime.

The metathesis reaction temperature may be a rate-controlling variable where the temperature is selected to provide a desired product at an acceptable rate. The metathesis temperature may be greater than −40° C., may be greater than about −20° C., and is typically greater than about 0° C. or greater than about 20° C. Typically, the metathesis reaction temperature is less than about 150° C., typically less than about 120° C. An exemplary temperature range for the metathesis reaction ranges from about 20° C. to about 120° C.

The metathesis reaction can be run under any desired pressure. Typically, it will be desirable to maintain a total pressure that is high enough to keep the cross-metathesis reagent in solution. Therefore, as the molecular weight of the cross-metathesis reagent increases, the lower pressure range typically decreases since the boiling point of the cross-metathesis reagent increases. The total pressure may be selected to be greater than about 10 kPa, in some embodiments greater than about 30 kPa, or greater than about 100 kPa. Typically, the reaction pressure is no more than about 7000 kPa, in some embodiments no more than about 3000 kPa. An exemplary pressure range for the metathesis reaction is from about 100 kPa to about 3000 kPa.

In some embodiments, the metathesis reaction is catalyzed by a system containing both a transition and a non-transition metal component. The most active and largest number of catalyst systems are derived from Group VI A transition metals, for example, tungsten and molybdenum.

In some embodiments, the unsaturated polyol ester is partially hydrogenated before it is subjected to the metathesis reaction. Partial hydrogenation of the unsaturated polyol ester reduces the number of double bonds that are available for in the subsequent metathesis reaction. In some embodiments, the unsaturated polyol ester is metathesized to form a metathesized unsaturated polyol ester, and the metathesized unsaturated polyol ester is then hydrogenated (e.g., partially or fully hydrogenated) to form a hydrogenated metathesized unsaturated polyol ester. In some embodiments, additional hydrogenation cycles are utilized to assist in the conversion of unsaturated polyol esters to primarily $C_9$-$C_{21}$ paraffins (alkanes), and preferably to $C_9$-$C_{15}$ paraffins (alkanes).

Hydrogenation may be conducted according to any known method for hydrogenating double bond-containing compounds such as vegetable oils. In some embodiments, the unsaturated polyol ester or metathesized unsaturated polyol ester is hydrogenated in the presence of a nickel catalyst that has been chemically reduced with hydrogen to an active state. Commercial examples of supported nickel hydrogenation catalysts include those available under the trade designations "NYSOFACT", "NYSOSEL", and "NI 5248 D" (from Englehard Corporation, Iselin, N.H.). Additional supported nickel hydrogenation catalysts include those commercially available under the trade designations "PRICAT 9910", "PRICAT 9920", "PRICAT 9908", "PRICAT 9936" (from Johnson Matthey Catalysts, Ward Hill, Mass.).

The hydrogenation catalyst may comprise, for example, nickel, copper, palladium, platinum, molybdenum, iron, ruthenium, osmium, rhodium, or iridium. Combinations of metals also may be used. Useful catalyst may be heterogeneous or homogeneous. In some embodiments, the catalysts are supported ruthenium catalysts.

In some embodiments, the hydrogenation catalyst comprises nickel that has been chemically reduced with hydrogen to an active state (i.e., reduced nickel) provided on a support. The support may comprise porous silica (e.g., kieselguhr, infusorial, diatomaceous, or siliceous earth) or alumina. The catalysts are characterized by a high nickel surface area per gram of nickel.

The particles of supported nickel catalyst may be dispersed in a protective medium comprising hardened triacylglyceride, edible oil, or tallow. In an exemplary embodiment, the supported nickel catalyst is dispersed in the protective medium at a level of about 22 weight % nickel.

The supported nickel catalysts may be of the type described in U.S. Pat. No. 3,351,566 (Taylor et al.), and incorporated by reference herein. These catalysts comprise solid nickel-silica having a stabilized high nickel surface area of 45 to 60 sq. meters per gram and a total surface area of 225 to 300 sq. meters per gram. The catalysts are prepared by precipitating the nickel and silicate ions from solution such as nickel hydrosilicate onto porous silica particles in such proportions that the activated catalyst contains 25 weight % to 50 weight % nickel and a total silica content of 30 weight % to 90 weight %. The particles are activated by calcining in air at 600° F. to 900° F., then reducing with hydrogen.

Useful catalysts having a high nickel content are described in EP 0 168 091 (incorporated by reference herein), wherein the catalyst is made by precipitation of a nickel compound. A soluble aluminum compound is added to the slurry of the precipitated nickel compound while the precipitate is maturing. After reduction of the resultant catalyst precursor, the reduced catalyst typically has a nickel surface area of the order of 90 to 150 sq. m per gram of total nickel. The catalysts have a nickel/aluminum atomic ratio in the range of 2 to 10 and have a total nickel content of more than about 66 weight %.

Useful high activity nickel/alumina/silica catalysts are described in EP 167,201. The reduced catalysts have a high nickel surface area per gram of total nickel in the catalyst. Useful nickel/silica hydrogenation catalysts are described in U.S. Pat. No. 6,846,772. The catalysts are produced by heating a slurry of particulate silica (e.g. kieselguhr) in an aqueous nickel amine carbonate solution for a total period of at least 200 minutes at a pH above 7.5, followed by filtration, washing, drying, and optionally calcination. The nickel/silica hydrogenation catalysts are reported to have improved filtration properties. U.S. Pat. No. 4,490,480 reports high surface area nickel/alumina hydrogenation catalysts having a total nickel content of 5% to 40% weight.

Commercial examples of supported nickel hydrogenation catalysts include those available under the trade designations "NYSOFACT," "NYSOSEL," and "NI 5248 D" (from Englehard Corporation, Iselin, N.H.). Additional supported nickel hydrogenation catalysts include those commercially available under the trade designations "PRICAT 9910," "PRICAT 9920," "PRICAT 9908," and "PRICAT 9936" (from Johnson Matthey Catalysts, Ward Hill, Mass.).

Hydrogenation may be carried out in a batch or in a continuous process and may be partial hydrogenation or complete hydrogenation. In a representative batch process, a vacuum is pulled on the headspace of a stirred reaction vessel and the reaction vessel is charged with the material to be hydrogenated (e.g., RBD soybean oil or metathesized RBD soybean oil). The material is then heated to a desired temperature. Typically, the temperature ranges from about 50° C. to 350° C., for example, about 100° C. to 300° C. or about 150° C. to 250° C. The desired temperature may vary, for example, with hydrogen gas pressure. Typically, a higher gas pressure will require a lower temperature. In a separate container, the hydrogenation catalyst is weighed into a mixing vessel and is slurried in a small amount of the material to be hydrogenated (e.g., RBD soybean oil or metathesized RBD soybean oil). When the material to be hydrogenated reaches the desired temperature, the slurry of hydrogenation catalyst is added to the reaction vessel. Hydrogen gas is then pumped into the reaction vessel to achieve a desired pressure of $H_2$ gas. Typically, the $H_2$ gas pressure ranges from about 15 to 3000 psig, for example, about 15 psig to 90 psig. As the gas pressure increases, more specialized high-pressure processing equipment may be required. Under these conditions the hydrogenation reaction begins and the temperature is allowed to increase to the desired hydrogenation temperature (e.g., about 120° C. to 200° C.) where it is maintained by cooling the reaction mass, for example, with cooling coils. When the desired degree of hydrogenation is reached, the reaction mass is cooled to the desired filtration temperature.

The amount of hydrogenation catalyst is typically selected in view of a number of factors including, for example, the type of hydrogenation catalyst used, the amount of hydrogenation catalyst used, the degree of unsaturation in the material to be hydrogenated, the desired rate of hydrogenation, the desired degree of hydrogenation (e.g., as measure by iodine value (IV)), the purity of the reagent, and the $H_2$ gas pressure. In some embodiments, the hydrogenation catalyst is used in an amount of about 10 weight % or less, for example, about 5 weight % or less or about 1 weight % or less.

After hydrogenation, the hydrogenation catalyst may be removed from the hydrogenated product using known techniques, for example, by filtration. In some embodiments, the hydrogenation catalyst is removed using a plate and frame filter such as those commercially available from Sparkler Filters, Inc., Conroe Tex. In some embodiments, the filtration is performed with the assistance of pressure or a vacuum. In order to improve filtering performance, a filter aid may be used. A filter aid may be added to the metathesized product directly or it may be applied to the filter. Representative examples of filtering aids include diatomaceous earth, silica, alumina, and carbon. Typically, the filtering aid is used in an amount of about 10 weight % or less, for example, about 5 weight % or less or about 1 weight % or less. Other filtering techniques and filtering aids also may be employed to remove the used hydrogenation catalyst. In other embodiments the hydrogenation catalyst is removed using centrifugation followed by decantation of the product.

The invention will now be described with reference to the following non-limiting examples.

EXAMPLES

Example 1

In this prophetic example, a fatty acid methyl ester is derived from soybean oil and is reacted with 1-butene in the presence of a metathesis catalyst, and under conditions sufficient to metathesize the soybean FAME. Subsequently, the metathesized product is reacted with hydrogen gas under conditions sufficient to convert the metathesized product into hydrocarbons. The distribution of hydrocarbons derived from this reaction is shown in the table below, as compared to a typical jet fuel distribution from fossil fuels.

TABLE

|  | Jet Fuel Derived from Fossil Fuel | Jet Fuel Derived from Soybean FAME + 1-butene |
|---|---|---|
| C04 | 0% | 0.00% |
| C05 | 0.10% | 0.71% |
| C06 | 0.20% | 12.06% |
| C07 | 1.75% | 10.28% |
| C08 | 4% | 0.10% |
| C09 | 5% | 6.91% |
| C10 | 8.20% | 23.02% |
| C11 | 11.75% | 0.00% |
| C12 | 9% | 18.11% |
| C13 | 4% | 3.35% |
| C14+ | 56.00% | 23.12% |

Example 2

In this working example, a jacketed, stainless steel, five gallon Parr reactor that was equipped with a dip-tube, overhead stirrer, internal cooling/heated coils, temperature probe, sampling valve and headspace gas release valve was charged with soybean oil (6.8 kg SBO, $MW_n$=864.4 g/mol, Costco, 85% unsaturation, determined by gas chromatography.) The soybean oil was thermally treated by heating at 200° C. for 1.5 hrs while purging with $N_2$ (100 mL/min flow.) The soybean oil in the Parr reactor was cooled to 19° C. and 1-butene (3.97 kg, CP grade) was added via the dip-tube from a pressurized 1-butene cylinder. A suspension of [1,3-bis-(2,4,6-trimethylphenyl)-2-imidazolidinylidene]dichlororuthenium(3-methyl-2-butenylidene)(tricyclohexylphosphine) (260 mg, C827 catalyst, Materia, Inc., Pasadena, Calif.) in 35 g soybean oil was prepared in a Fischer-Porter pressure vessel and added to the Parr reactor through a dip-tube at room temperature by pressurizing Fischer Porter vessel with $N_2$ to about 90 psig. An additional 35 g of oil were used to rinse the residual C827 remaining in the Fischer Porter vessel into the Parr reactor. The reaction mixture was stirred for 2 hours at 60° C. and the extent of reaction was monitored by gas chromatography (gc.) The resulting olefin/triglyceride reaction product was allowed to cool to 31° C. overnight while much of the excess 1-butene and the other volatile gases were vented from the headspace of the Parr reactor with a stream of $N_2$ (100 mL/min flow.) The reaction mixture was transferred to a 3-necked round bottom flask, and tris(hydroxymethyl)phosphine (THMP) 1.5 M in isopropanol (30 equiv. THMP/equiv. C827) was added. The yellow mixture was stirred for 2 hours at 80° C., allowed to cool and washed with water while the temperature was between 40° C. to 30° C. Two layers separated after 30 minutes. A second water wash of the organic layer formed an emulsion at 25° C. which was allowed to separate overnight. The organic layer was separated and dried over anhydrous $Na_2SO_4$ for 2 hours. The hazy yellow mixture was filtered through a Buchner funnel containing filter paper, resulting in the isolation of 7.72 kg of reaction product as a clear yellow filtrate. An aliquot of the reaction product was found by gas chromatographic analysis, following transesterification with 1% wt/wt NaOMe in methanol at 60° C., to contain approximately 15 weight % $C_6$-$C_8$ olefins, approximately 22 weight % $C_9$-$C_{18}$ olefins, approximately 19 weight % methyl 9-decenoate, approximately 15 weight % methyl 9-dodecenoate, approximately 8 weight $C_{13}$-$C_{15}$ methyl esters, and approximately 17 weight % $C_{16}$-$C_{18}$ methyl esters.

A 325.0 g portion of the olefin/triglyceride reaction product and 2.50 g of 5% Ru on carbon catalyst (Type D101002, 51.7% $H_2O$ content, from Johnson-Matthey plc) were charged to a 600 mL, stainless steel Parr reactor that was equipped with a dip-tube, an overhead stirrer with gas entrainment impeller, internal cooling coils, temperature probe, headspace valve, and an external heating mantle. The reactor was sealed and the contents were purged with nitrogen gas for five minutes. After leak testing the reactor at 500 psig with hydrogen gas, the pressure of the reactor was reduced to 200 psig. The mixture was stirred at 900 rpm as the system was heated to 80° C. The initial reaction proceeded rapidly over a thirty minute period during which hydrogen was added to the reactor to maintain the pressure between 150 and 500 psig and the temperature increased to 153° C. before falling back to 72° C. The pressure of the reactor was adjusted to 500 psig with hydrogen, the temperature was raised to 110° C., and the reactor contents were stirred an additional two hours before cooling to ambient temperature and venting to about 50 psig. Gas chromatographic analysis of a filtered aliquot of the liquid reactor contents found alkanes and saturated esters, indicating that the reactants that contained carbon-carbon double bond had been hydrogenated. The reactor was recharged at 21° C. with hydrogen to 400 psig and heated to between 275 and 300° C. for 5.5 hours. After four additional cycles of hydrogen addition and heating at 275-300° C. for an additional 18 hours, accumulating volatile products were removed at room temperature by pressuring the reactor with hydrogen to 320 psig and venting the headspace to 100 psig. After a total of 59 hours at 275-300° C. over eleven hydrogenation cycles, which included a twenty minute, nitrogen purge of accumulating volatiles that was done at 70° C., $C_9$-$C_{21}$ alkanes constituted over half of the organic product in the reaction mixture, of which 87% were the desired $C_9$-$C_{15}$ alkanes. Small amounts of hexane and octane also were seen. The non-paraffinic products were predominantly $C_{10}$-$C_{18}$ acids, alcohols, and esters, which were found to continue to convert to additional $C_9$-$C_{18}$ alkane product with additional hydrogenation cycles.

Comparative Example

In this working example, soybean oil (263 g, Cargill, 10% $C_{16}$/90% $C_{18}$ esters, by gc) and 2.51 g of 5% Ru on carbon catalyst (Type D101002, 51.7% $H_2O$ content, from Johnson-Matthey plc) were charged to a 600 mL, stainless steel Parr reactor that was equipped with a dip-tube, an overhead stirrer with gas entrainment impeller, internal cooling coils, temperature probe, headspace valve, and an external heating mantle. The reactor was sealed and the contents were purged with nitrogen gas for five minutes. After leak testing at 500 psig with nitrogen gas, the reactor was purged with hydrogen for 15 minutes as the reactor was heated to 50° C. The hydrogen pressure in the reactor was raised to 200 psig and the mixture was stirred at 900 rpm as the system was heated to 110° C. The initial reaction proceeded rapidly over a thirty minute period during which hydrogen was added to maintain the pressure between 200 and 500 psig and the temperature increased to 115° C. before falling back to 110° C. The pressure of the reactor was adjusted to 500 psig with hydrogen and the reactor contents were stirred an additional three hours while the reaction temperature was increased to 265° C. and held at that temperature for three hours; throughout the six hour period, hydrogen was added intermittently to maintain the reactor pressure between 460 and 510 psig. The reaction was allowed to cool overnight and vented. After ten additional periods of hydrogen addition and heating at 275-300° C. for an additional 67 hours, the organic products in the reaction mixture were found to be greater than 99 weight % $C_9$-$C_{21}$ alkanes, of which only 18 weight % were the desired $C_9$-$C_{15}$ range.

Volatile products from the reaction of soybean oil with 1-butene were analyzed using an Agilent 6890 gas chromatography (GC) instrument with a flame ionization detector (FID). The following conditions and equipment were used:

Column: Restek Rtx-5, 30 m×0.25 mm (ID)×0.25 μm film thickness.

Injector temperature: 250° C.

Detector temperature: 280° C.

Oven temperature: 35° C. starting temperature, 1 minute hold time, ramp rate 8° C./min to 80° C., hold time: 0 minutes, ramp rate 8° C./min to 270° C., 10 minute hold time Carrier gas: Helium Mean gas velocity: 31.3±3.5% cm/sec (calculated)

Split ratio: ~50:1

The products were characterized by comparing peaks with known standards, in conjunction with supporting data from mass spectrum analysis (GCMS-Agilent 5973N). GCMS analysis was accomplished with a second Rtx-5, 30 m×0.25 mm (ID)×0.25 μm film thickness GC column, using the same method as above.

Alkane and acid analyses were performed using an Agilent 6850 instrument and the following conditions:

Column: Restek Rtx-65, 30 m×0.32 mm (ID)×0.1 μm film thickness

Injector temperature: 300° C.

Detector temperature: 375° C.

Oven temperature: 55° C. starting temperature, 5 minute hold time, ramp rate 20° C./min to 350° C., 20.25 minute hold time
Carrier gas: Hydrogen
Flow rate: 1.0 mL/min
Split ratio: 15:1

The products were characterized by comparing peaks with known standards.

Fatty acid methyl ester (FAME) analyses were performed using an Agilent 6850 instrument and the following conditions:

Column: J&W Scientific, DB-Wax, 30 m×0.32 mm (ID)× 0.5 μm film thickness
Injector temperature: 250° C.
Detector temperature: 300° C.
Oven temperature: 70° C. starting temperature, 1 minute hold time, ramp rate 20° C./min to 180° C., ramp rate 3° C./min to 220° C., 33.5 minute hold time
Carrier gas: Hydrogen
Flow rate: 1.0 mL/min
Split ratio: 50:1

The working example above demonstrates the improved yield of $C_9$-$C_{15}$ fuel range of alkanes that the inventive process gives versus the yield of $C_9$-$C_{15}$ fuel range of alkanes from the known art.

While the invention as described may have modifications and alternative forms, various embodiments thereof have been described in detail. Further while the present invention has been described in terms of non-limiting examples, it will be understood, of course, that the invention is not limited thereto since modifications may be made to those skilled in the art, particularly in light of the foregoing teachings.

What is claimed is:

1. A method of producing a jet fuel composition comprising:
    providing a feedstock comprising natural oil glycerides or derivatives thereof, wherein the derivatives are obtained by saponification, esterification, hydrogenation, isomerization, oxidation, reduction, or a combination thereof;
    reacting the feedstock with a low-weight olefin to provide a metathesized product having metathesized glycerides or metathesized derivatives thereof, wherein the metathesized glycerides or metathesized derivatives thereof comprise ester, acid, or alcohol moieties; and
    hydrogenating the metathesized product to provide a jet fuel composition, wherein at least a portion of the metathesized glycerides or the metathesized derivatives thereof having the ester, acid, or alcohol moieties are converted into paraffin.

2. The method of claim 1, further comprising isomerizing the jet fuel composition, wherein at least a portion of normal-paraffin compounds in the jet fuel composition are isomerized into iso-paraffin compounds.

3. The method of claim 1, wherein the jet fuel composition comprises $C_2$-$C_4$ hydrocarbons, $C_{18}$+ compounds, or water, and wherein the method further comprises separating at least a portion of the $C_2$-$C_4$ hydrocarbons, at least a portion of the $C_{18}$+ compounds, or at least a portion of the water from the jet fuel composition.

4. The method of claim 3, further comprising isomerizing the jet fuel composition after the separating, wherein at least a portion of normal-paraffin compounds in the jet fuel composition are isomerized into iso-paraffin compounds.

5. The method of claim 1, wherein the low-weight olefin comprises at least one low-weight olefin selected from the group consisting of ethylene, propylene, 1-butene, and 2-butene.

6. The method of claim 1, wherein the low-weight olefin comprises an alpha-olefin.

7. The method of claim 6, wherein the alpha-olefin is a $C_2$-$C_{10}$ alpha-olefin.

8. The method of claim 1, wherein the low-weight olefin comprises 1-butene.

9. The method of claim 1, wherein the low-weight olefin comprises at least one $C_4$ to $C_{10}$ branched olefin.

10. The method of claim 1, wherein the jet fuel composition has a hydrocarbon distribution centered at $C_{10}$ to $C_{12}$ hydrocarbons.

11. The method of claim 1, wherein the jet fuel composition comprises at least 70 wt % $C_9$-$C_{15}$ alkanes based on a total weight of hydrocarbons in the jet fuel composition.

12. The method of claim 1, wherein the jet fuel composition comprises at least 80 wt % $C_9$-$C_{15}$ alkanes based on a total weight of hydrocarbons in the jet fuel composition.

13. The method of claim 1, wherein the natural oil glycerides comprise natural oil triglycerides.

14. The method of claim 1, wherein the natural oil glyceride derivatives comprise fatty acid methyl esters.

* * * * *